Jan. 17, 1961  I. D. SMITH  2,968,455
LANDING GEAR DAMPER
Filed May 16, 1957  2 Sheets-Sheet 1
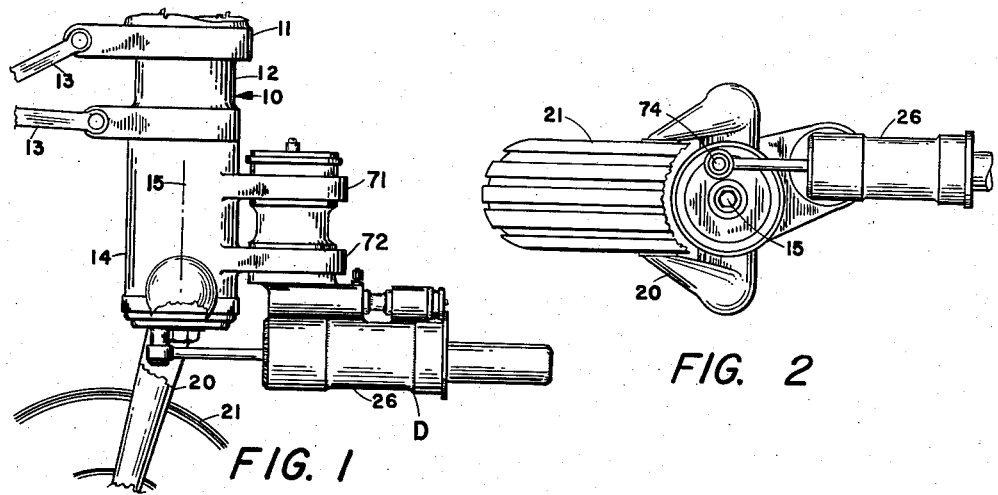
FIG. 1
FIG. 2
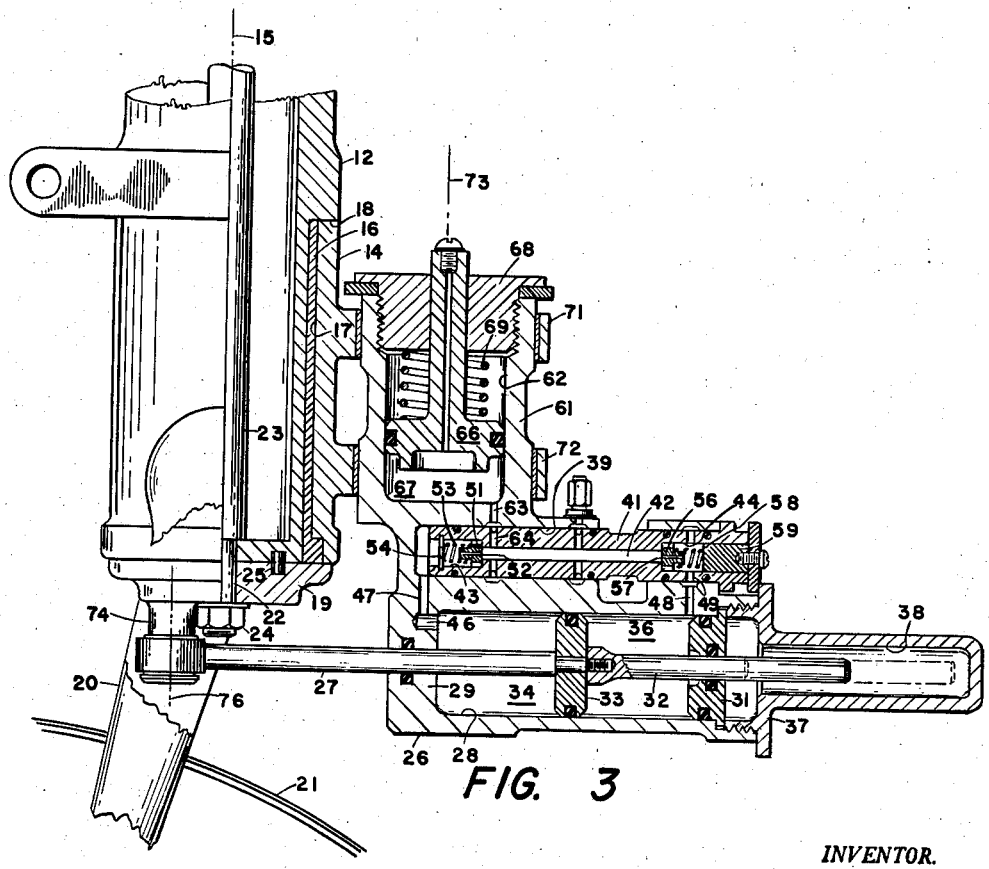
FIG. 3
INVENTOR.
IRA D. SMITH
BY
ATTORNEY United States Patent Office 2,968,455
Patented Jan. 17, 1961

2,968,455
LANDING GEAR DAMPER

Ira D. Smith, Bedford, Ohio, assignor to Cleveland Pneumatic Industries, Inc., Cleveland, Ohio, a corporation of Ohio Filed May 16, 1957, Ser. No. 659,566
7 Claims. (Cl. 244—103)

This invention relates to landing gears generally and more particularly to a new and improved landing gear shimmy damper combination.

It is an important object of this invention to provide an aircraft landing gear damper combination wherein the damper is arranged so that the landing gear can be swiveled through a full 360 degrees without disconnecting the damper.

It is another important object of this invention to provide an aircraft landing gear damper mounting which permits free swiveling of the landing gear through a full 360 degrees without disconnecting the damper.

It is still another object of this invention to provide a castering aircraft landing gear having means controlling such castering movement wherein the landing gear has freedom for 360 degrees of castering movement.

Other objects and advantages will appear from the following descriptions and drawings, wherein:

Figure 1 is a fragmentary side elevation of a landing gear with the preferred shimmy damper mounted thereon;

Figure 2 is a bottom view of the landing gear damper combination with some of the parts removed to show the mounting of the damper;

Figure 3 is an enlarged fragmentary side elevation partially in section showing the preferred damper structure; and, Figure 4a through 4d are schematic views showing progressive positions the elements assume as the landing gear is swiveled through 360 degrees.

Figure 4A:
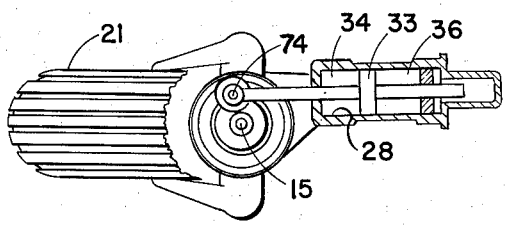
Figure 4B:
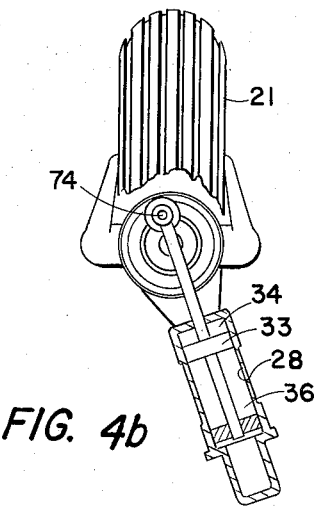
Figure 4C:
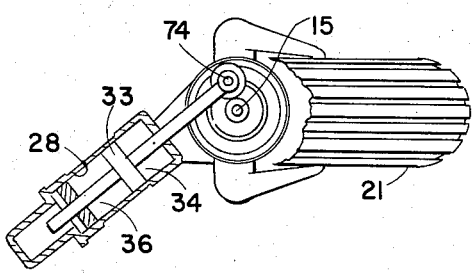
Figure 4D:
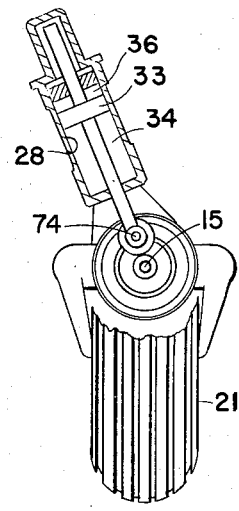

Referring to the drawing, the illustrated landing gear damper combination is of the type that would normally be used in lighter than air aircraft wherein a strut 10 is adapted to be mounted on an aircraft and a damper "D" is carried by the strut. The strut 10 includes a cylinder 11 adapted to be mounted on the aircraft and a piston 12 which telescopes axially into the cylinder 11 and co-operates therewith to form an air-oil shock absorber and spring which resiliently supports the weight of the aircraft when it is on the ground. The cylinder 11 and piston 12 are connected by conventional torque arms 13 which prevent relative rotation therebetween while permitting the piston 12 to move vertically relative to the cylinder 11.

Journaled on the lower end of the piston 12 is a cylindrical housing 14 which is formed with an integral depending wheel support or fork 20, both of which are free to rotate relative to the piston around the central axis 15 of the strut 10. Referring to Figure 3 a bearing 16 is positioned on the piston 12 inside a bore 17 in the fork housing 14 so that the fork 20 is laterally supported on the piston 12 and is free to rotate relative thereto. The upper end of the fork housing 14 engages a shoulder 18 on the piston 12 and the other end of the housing engages an end plate 19 mounted on the lower end of the piston 12. Thus the housing 14 is axially fixed relative to the piston 12 but is free to rotate around the central axis 15. Mounted in the usual manner between the two arms of the fork 20 is a landing wheel 21. Normally the landing wheel 21 is mounted so that it trails the central axis 15 and will caster when the aircraft is moved on the ground. The end plate 19 is secured to the piston 12 by a stem 22 on the usual meter pin 23 which is threaded to receive a nut 24 that engages the lower side of the end plate 19. A key 25 extends between the piston 12 and the end plate 19 to prevent rotation therebetween.

To provide rotational dampening between the fork 20 and the piston 12 the damper "D," best shown in Figure 3, is used. The damper itself is of the piston and cylinder type and includes a cylinder body 26 and an axially movable piston 33. The cylinder body 26 is formed with the main bore 28 terminating at its inner end in an apertured end wall 29 through which the piston rod 27 projects. The outer end of the cylinder bore 28 is closed by a gland member 31 which is also formed with an aperture through which a piston extension 32 projects. The extension 32 is threaded onto the piston 33 and axially secures the piston on the piston rod 27. The main bore 28, the end wall 29 and the gland 31 cooperate to form a liquid filled cavity which is divided into first and second dampening chambers 34 and 36 by the piston head 33. The gland 31 is held in position by a cap 37 threaded into the open end of the cylinder body 26, which cap is formed with an axially extending recess 38 into which the piston extension 32 is free to move.

When the piston head 33 is moved along the main bore 28 by the piston rod 27 the volume of one of the chambers 34 or 36 is reduced and the volume of the other chamber is increased. Therefore passage means are provided to connect the two chambers so that the liquid in the chamber in which the volume is reduced is free to flow to the chamber in which the volume is increased. To provide this passage means the cylinder body 26 is formed with a second bore 39 spaced from and parallel to the main bore 28. A stem 41 is positioned within the second bore 39 and is formed with a central passage 42 having enlarged open ends 43 and 44. The enlarged end 43 is connected to the first dampening chamber 34 through passages 46 and 47, and the enlarged end 44 is connected to the second dampening chamber 36 through passages 48 and 49 formed in the cylinder body 26 and stem 41 respectively.

Located in each of the enlarged ends 43 and 44 of the central passage 42, is a valve member 51 and 56 respectively each having a restricted orifice 52 and 57 respectively extending therethrough. These two valve members 51 and 56 are resiliently held against the openings of the central passage 42 within the enlarged ends thereof by a spring 53 and 58 respectively retained in the enlarged ends of the central passage, one by a snap ring 54 and the other by a plug 59. Therefore upon movement of the piston 33 to the left, the flow of the liquid from chamber 34 to chamber 36 must take place through the restricted orifice of the valve member 51 before it can lift the valve member 56 to free flow into the chamber 36. Similarly upon movement of the piston to the right, fluid flow from the chamber 36 must take place through the restricted orifice 57 before it can lift the valve member 51 to free flow into the chamber 34, thereby resulting in a device adapted to dampen the movement of the piston 33 within the cylinder 26, which operates in a manner well known in the art.

The cylinder body 26 is formed with a vertically projecting portion 61 having an accumulator bore 62 connected to the passage 42 by passages 63 and 64. Positioned within the accumulator bore 62 is a piston 66 which in cooperation with the bore forms an accumulator chamber 67. The upper end of the accumulator bore 62 is closed by an end member 68 threaded into the open end of the bore 62. A spring 69 extends between the end member 68 and the piston 66 and resiliently urges the piston downward thereby pressurizing the liquid within the accumulator chamber 67. The pressure within the accumulator chamber is determined by the force exerted by the spring 69 and is in turn the pressure maintained in the system. The accumulator chamber is provided to compensate for liquid expansion or contraction due to temperature variations and insures that the damper is always properly filled with liquid. Thus far the structure is conventional and has been described to clearly set forth the environment of the invention.

Referring now more particularly to the invention, the mounting of the damper on the landing gear is provided by a novel structure wherein the cylinder body 26 is journaled on apertured mounting arms 71 and 72 formed on the fork housing 14 so that the cylinder body 26 is free to rotate relative to the fork 20 about the first eccentric axis 73 spaced from and parallel to the central axis 15. The piston rod 27 is journaled on a lug 74 formed on the end plate 19 below the piston 12 so that it is free to rotate relative thereto about a second eccentric axis 76 which is spaced from and parallel to both of the axes 15 and 73. This structure provides a mounting for the damper wherein the piston 27 moves axially relative to the cylinder bore 26 as the fork 20 rotates relative to the strut piston 12 due to the changing relationship of the eccentric axes 73 and 74.

Reference should be made to Figures 4a through 4d for a clear understanding of the operation of the damper. In Figure 4a the elements are shown in the neutral position at which time the wheel 21 is aligned with the major axis of the aircraft. At this time piston head 33 is in a neutral position within the main bore 28. It should be noted that the lug 74 is stationary as the wheel 21 is swiveled about the central axis 15. As the wheel 21 is swiveled 90 degrees in a clockwise direction to the position of Figure 4b, the piston head 33 moves toward the inner end of the main bore 28 reducing the volume of the chamber 34 and at the same time increasing the volume of the chamber 36. This causes flow of liquid from the chamber 34 to the chamber 36 through the restricted orifice 52 shown in Figure 3. As the wheel 21 continues to rotate in clockwise direction to the position of Figure 4c the piston head 33 moves back to the neutral position in this case causing displacement of liquid from the chamber 36 to the chamber 34. It should be noted that the wheel is 180 degrees displaced from the position of Figure 4a when it reaches the position of Figure 4c. Continued movement of the wheel 21 to the position of Figure 4d causes the piston head 33 to continue to move toward the outer extreme position and displace liquid from the chamber 36 to the chamber 34. After the wheel 21 is in the position of Figure 4d, continued clockwise rotation returns it to the position of Figure 4a. Those skilled in the art will recognize that the swiveling or rotation described immediately above shows the operation of the damper when the wheel 21 is swiveled through a full 360 degrees in a clockwise direction. It is apparent that swiveling motion in the counterclockwise direction will produce movement of the elements through the illustrated positions in the opposite sequence. Because the damper provides full freedom for swiveling movement it is not necessary to provide either automatic or manual means for disconnecting the damper when the wheel 21 is swiveled. Thus a superior mechanism is provided and the damper is always in condition to operate.

By utilizing the above described structure wherein the damper piston rod 27 extends below the strut piston 12 only the wheel support proper is rotated and only a small mass is subject to rotational shimmy. In the more conventional landing gears the strut piston is rotationally fixed relative to the wheel and therefore rotates when the system is subject to shimmy conditions. This, of course, increases the shimmy mass and complicates the damping problem. In addition wear is reduced since the seals in the air-oil spring are not subject to rotational stresses, since the strut piston and cylinder do not rotate relative to each other. It is important that the axis 76 be spaced from the central axis 15 by a distance less than the space inbetween the depending projections 20 from the central axis 15 so that interference will not develop as the fork 14 rotates through a full 360 degrees.

It should be understood that even though the embodiment shown utilizes a damper, the piston and cylinder structure could be used equally well to provide steering of the wheel 21 if fluid under pressure was supplied to the piston and cylinder so that it could operate as a steering motor. Those skilled in the art will therefore recognize that if power steering were desired full swiveling could be accomplished without disconnecting the steering motor. It is realized that the piston and cylinder type motor would not function to provide power steering through the full 360 degrees but it would permit freedom for swiveling movement without disconnecting the steering motor.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A landing gear comprising a strut including upper and lower telescoping members axially movable and rotationally fixed relative to each other, said upper member being adapted to be mounted on the frame of an aircraft, a wheel support journaled on the said lower member for rotation relative thereto about a first axis, and a damper consisting of co-operating cylinder and piston elements movable relative to each other and damping means resisting such relative movement, a pivot on the bottom of said lower member, one of said elements being journaled on said pivot for rotation relative thereto about a second axis spaced from and parallel to said first axis, and the other of said elements being journaled on said wheel support for rotation relative thereto about a third axis spaced from and parallel to the other of said axes.

2. A landing gear comprising a strut including an upper and lower telescoping members axially movable and rotationally fixed relative to each other, said upper member being adapted to be mounted on the frame of an aircraft, a wheel support journaled on said lower member adjacent to the bottom thereof for rotation relative thereto about a first axis, a device including piston and cylinder elements axially movable relative to each other, a pivot on the bottom of said lower member, one of said elements being journaled on said pivot for rotation relative thereto about a second axis spaced from and parallel to said first axis, and the other of said elements being journaled on said wheel support for rotation relative thereto about a third axis spaced from and parallel to the other of said axes, and means within said device controlling the relative axial movement of said elements and their rotation about their respective axes.

3. A landing gear comprising a strut including an upper and lower telescoping member axially movable and rotationally fixed relative to each other, said upper member being adapted to be mounted on the frame of an aircraft, a wheel support journaled on said lower member adjacent to the bottom thereof for rotation relative thereto about a first axis, cooperating piston and cylinder elements one capable of first movement relative to the other, a pivot on the bottom of said lower member, a connection between one of said elements and pivot enabling pivotal movement of said one element about a second axis spaced from and parallel to said first axis, a connection between the other of said elements and wheel support enabling pivotal movement of said other element about a third axis spaced from and parallel to the other of said axes, said pivotal movement being translated into said first movement of said elements by virtue of said connections, and fluid flow means associated with said piston and cylinder elements controlling said first movement.

4. A landing gear comprising a strut including an upper and lower telescoping member axially movable and rotationally fixed relative to each other, said upper member being adapted to be mounted on the frame of an aircraft, a wheel support journaled on said lower member adjacent to the bottom thereof for rotation relative thereto about a first axis, a device including co-operating cylinder and piston elements movable relative to each other, one of said elements being carried by said wheel support for rotation therewith about said first axis, the other of elements being pivotally connected to the bottom end of said wheel support for rotation relative thereto about a second axis offset from but parallel with said first axis, rotation of said other element about said second axis affecting the position of said elements relative to one another, and fluid flow means within said device controlling the movements of said elements relative to one another.

5. A landing gear comprising a strut including an upper and lower telescoping member axially movable and rotationally fixed relative to each other, said upper member being adapted to be mounted on the frame of an aircraft, a support journaled on said lower member adjacent to the bottom thereof for rotation relative thereto about a first axis, a depending projection formed on said support extending below said lower member, a ground engaging wheel carried by said depending projection, and a damper including co-operating cylinder and piston elements movable relative to each other and damping means resisting such relative movement, a pivot connecting one of said elements to the lower end of said lower member for rotation about a second axis spaced from and parallel to said first axis, and the other of said elements being journaled on said support for rotation relative thereto about a third axis spaced from and parallel to the other of said axes.

6. A landing gear comprising a nonrotatable elongated strut, a support journaled adjacent to one end of said strut for rotation relative thereto about a first axis, a ground engaging element on said support, and means including co-operating cylinder and piston elements movable relative to each other, one of said elements being pivoted on said one end of said strut for rotation relative thereto about a second axis eccentric from said first axis and the other of said elemnets being pivoted on said support for rotation relative thereto about a third axis eccentric from said first axis, said means producing a force along a line connecting said second and third axes operating to control rotation of said support around said first axis.

7. A landing gear comprising a strut including upper and lower telescoping members rotationally fixed relative to each other, said upper member being adapted to be mounted on the frame of an aircraft, a support journaled on the lower member adjacent to the bottom thereof for rotation relative thereto about a first axis, a depending projection formed on said support spaced from said first axis and extending below said lower member, a ground engaging element carried by said depending projection, a pivot on the bottom of said lower member spaced from said first axis by a distance less than the spacing between said projection and said first axis, cooperating piston and cylinder elements movable relative to each other one of which is journaled on said pivot and the other of which is journaled on said support at a point spaced from said first axis, and fluid control means cooperating with said piston and cylinder controlling relative movement therebetween and thereby controlling rotation of said support around said first axis.

References Cited in the file of this patent

UNITED STATES PATENTS

| 2,336,567 | Potter | Dec. 14, 1943 |
| 2,403,383 | Levy | July 2, 1946 |
| 2,424,233 | Greenough | July 22, 1947 |